United States Patent
Zhu et al.

(10) Patent No.: US 12,320,738 B1
(45) Date of Patent: Jun. 3, 2025

(54) FIRE SMOKE DETECTION METHOD AND FIRE SMOKE DETECTOR BASED ON PARTICLE SHAPE CHARACTERISTICS

(71) Applicant: HUAZHONG UNIVERSITY OF SCIENCE AND TECHNOLOGY, Hubei (CN)

(72) Inventors: Ming Zhu, Hubei (CN); Mengxue Lin, Hubei (CN); Lei Chen, Hubei (CN); Renshan Zhang, Hubei (CN); Maosen Wang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 19/004,437

(22) Filed: Dec. 29, 2024

(30) Foreign Application Priority Data

Aug. 1, 2024 (CN) .......................... 202411049131.9

(51) Int. Cl.
*G01N 15/14* (2024.01)
*G01N 15/00* (2024.01)
*G01N 15/1429* (2024.01)

(52) U.S. Cl.
CPC ..... *G01N 15/1456* (2013.01); *G01N 15/1425* (2013.01); *G01N 15/1429* (2013.01);
(Continued)

(58) Field of Classification Search
CPC ........... G01N 15/1456; G01N 15/1425; G01N 15/1429; G01N 2015/0046; G01N 2015/1486; G01N 2015/1497
(Continued)

(56) References Cited

U.S. PATENT DOCUMENTS

2010/0303917 A1* 12/2010 Watson .............. G01N 33/6872
977/773
2010/0303918 A1* 12/2010 Watson .................. A61K 33/00
977/773

(Continued)

FOREIGN PATENT DOCUMENTS

| CN | 114858675 | 8/2022 |
| CN | 116202917 | 6/2023 |
| CN | 117690250 | 3/2024 |

*Primary Examiner* — Md M Rahman
(74) *Attorney, Agent, or Firm* — JCIPRNET

(57) ABSTRACT

A fire smoke-detection method and detector based on particle shape characteristics for detecting particles in an optical dark chamber. An optical path angle between one blue light and one infrared light and a photoelectric conversion module is an acute angle, while an optical path angle between another blue light and the photoelectric conversion module is an obtuse angle. The detection method includes: starting a light source combination, calculating a change value between a current scattered light optical power and a background value of each light source, when the change value exceeds a set threshold, continuously starting the light source combination and constructing a space vector from the recorded change values, and using a classifier to classify a plurality of space vectors to obtain a plurality of classification results with categories including fire smoke and interfering aerosols; and counting the classification results to obtain the correct classification result.

16 Claims, 3 Drawing Sheets

(52) U.S. Cl.
CPC ............... *G01N 2015/0046* (2013.01); *G01N 2015/1486* (2013.01); *G01N 2015/1497* (2013.01)

(58) Field of Classification Search
USPC ........................................................ 356/338
See application file for complete search history.

(56) References Cited

U.S. PATENT DOCUMENTS

| | | | | |
|---|---|---|---|---|
| 2010/0316723 | A1* | 12/2010 | Watson | G01N 33/6872 977/773 |
| 2011/0114744 | A1* | 5/2011 | Ricciardi | A61L 2/22 239/4 |

* cited by examiner

FIRE SMOKE DETECTION METHOD AND FIRE SMOKE DETECTOR BASED ON PARTICLE SHAPE CHARACTERISTICS

CROSS-REFERENCE TO RELATED APPLICATION

This application claims the priority benefit of China application serial no. 202411049131.9, filed on Aug. 1, 2024. The entirety of the above-mentioned patent application is hereby incorporated by reference herein and made a part of this specification.

BACKGROUND

Technical Field

The disclosure belongs to the technical field related to fire monitoring, and more specifically, relates to a fire smoke detection method and fire smoke detector based on particle shape characteristics.

Description of Related Art

Fire smoke is an aerosol produced by the combustion of flammable materials, so it is both a byproduct of fire and considered a precursor to fire occurrence. It is the most obvious characteristic in the early stages of a fire. To detect fire at an earlier stage, smoke detectors have become the primary fire sensors. At present, the most widely used are point-type photoelectric fire smoke detectors, whose main advantages are simple structure, low costs, and easy maintenance, without causing environmental pollution.

The core structure of a photoelectric smoke detector is an optical dark chamber that allows smoke to enter while blocking ambient light. Inside the optical dark chamber, there is a light source and a photoelectric conversion device. This type of detector mainly utilizes the optical scattering principle of particles. When there is no fire smoke in the detection chamber, the detector is in a normal monitoring state and will not alarm. When smoke produced by combustion enters the detection chamber, due to the scattering effect of smoke particles on light, the scattered light signal collected by the photoelectric conversion device will increase and gradually intensify as the smoke concentration increases. When this signal increases beyond a specific threshold value, the detector will determine that a fire has occurred and generate an alarm signal.

Conventional fire smoke detectors may be interfered by non-fire aerosols such as cooking fumes, dust, and water vapor. In particular, smoke detectors used in homes are easily interfered by kitchen fumes, causing fire detectors to give false alarms.

SUMMARY

In view of the above deficiencies or improvement needs of the related art, the disclosure provides a fire smoke detection method and fire smoke detector based on particle shape characteristics with an aim to accurately distinguish between interfering aerosols and fire smoke, reduce the false alarm rate of the fire smoke detector, and improve the accuracy of fire alarms.

To achieve the above, one aspect of the disclosure provides a fire smoke detection method based on particle shape characteristics for detecting particles in an optical dark chamber. The optical dark chamber includes a light source combination and a photoelectric conversion module D. The light source combination includes a light source B1, a light source I1, and a light source B2. The light source B1 and the light source B2 are both blue light sources, the light source I1 is an infrared light source. A center of the optical dark chamber is O. An angle of change in an optical path of a light ray from the light source B1 reflected through the center O to the photoelectric conversion module D is an acute angle. An angle of change in an optical path of a light ray from the light source I1 reflected through the center O to the photoelectric conversion module D is an acute angle. An angle of change in an optical path of a light ray from the light source B2 reflected through the center O to the photoelectric conversion module D is an obtuse angle.

The fire smoke detection method based on particle shape characteristics includes the following steps.

In step S1, a background value of a scattered light optical power of each light source is obtained. The background value of each light source is an optical power of scattered light from the corresponding light source received by the photoelectric conversion module in an environment without fire smoke and interfering aerosols.

In step S2, the light source combination is periodically started to send light pulse signals in sequence, a change value of each light source is calculated, and it is determined whether any change value exceeds a set threshold value, if not, step S2 is repeated, and if so, it is considered that there is an abnormality and step S3 is executed. The change value of each light source is an absolute value of a difference value between a current scattered light optical power from the light source received by the photoelectric conversion module D and the background value of the scattered light optical power of the light source.

In step S3, the light source combination is started n times in succession after an abnormality occurs, and the resulting change value is recorded, where n is a positive integer.

In step S4, the three change values of the light source combination at each start-up is constructed into a space vector, n space vectors are classified by a classifier, n classification results are obtained, where the classifier is a trained neural network model, and classification categories include fire smoke and interfering aerosols, the obtained n classification results are counted; and when the number of one category is greater than or equal to k, it is determined that the category is the correct classification result, where k>n/2.

Further, in step S4, when there are no categories with a number greater than or equal to k in the counting results of multiple classifications, step S3 is proceeded to re-obtain the change value to re-classify until the correct classification result is determined.

Further, n is greater than or equal to 10, and k is greater than or equal to 8.

Further, the classification categories include fire white smoke, fire black smoke, and interfering aerosols, and the interfering aerosols include any one or more of dust, water vapor, or cooking fumes.

Further, the process of obtaining the background value of the scattered light optical power of each light source in step S1 includes the following step.

Initialization is performed: in an environment without fire smoke and interfering aerosols, each light source is started in turn and the optical power of scattered light from the corresponding light source received by the photoelectric conversion module is obtained as the background value of the scattered light optical power of the corresponding light source.

Further, a period of starting the light source combination to send the light pulse signals is 1 second or several seconds, and a pulse width of each light pulse signal ranges from several milliseconds to tens of milliseconds.

Further, the classifier includes a plurality of binary classification models of support vector machines (SVMs). Each of the binary classification models is used to implement classification of two different categories. When the classifier is used to classify any space vector, each binary classification model performs binary classification on the input space vector, and a mode of the classification results of all binary classification models is treated as the classification result of the classifier for the vector.

Another aspect of the disclosure further provides a fire smoke fire detector based on particle shape characteristics including an optical dark chamber and a control module.

The optical dark chamber includes a light source combination and a photoelectric conversion module D. The light source combination includes a light source B1, a light source I1, and a light source B2. The light source B1 and the light source B2 are both blue light sources, the light source I1 is an infrared light source. A center of the optical dark chamber is O. An angle of change in an optical path of a light ray from the light source B1 reflected through the center O to the photoelectric conversion module D is an acute angle. An angle of change in an optical path of a light ray from the light source I1 reflected through the center O to the photoelectric conversion module D is an acute angle. An angle of change in an optical path of a light ray from the light source B2 reflected through the center O to the photoelectric conversion module D is an obtuse angle.

The control module is configured to execute the method according to any one of the above.

Further, the acute angles are not less than 20°, and the obtuse angle is not greater than 170°.

Further, the angles of the two acute angles are the same or differ by less than 10°.

To sum up, the above technical solutions provided by the disclosure have the following beneficial effects compared with the related art.

1. In the environment of smoke detection, there are differences in shape between interfering aerosols and fire smoke. Smoke particles generally exhibit chain-like shape characteristics, while interfering aerosols such as dust, water vapor, and cooking fumes are generally spherical. These differences in particle shape can manifest as unique fingerprint characteristics of particles in light scattering. Therefore, classification of fire smoke and interfering aerosols can be achieved through the differences in particle shape, and that a false alarm rate of a conventional fire smoke detector can be decreased. Through research, the applicant has found that in the design of photoelectric fire smoke detectors, scattering characteristics of light sources with the same wavelength but different observation angles can be used to distinguish particle shapes. However, the research also found that when interfering aerosol particles are larger, it may affect the change in scattered light intensity, which can cause some deviation in the sensing of these scattering characteristics. To reduce false alarms when the interfering aerosol particles are larger, the research and development team further explored and found that adding one light source with a different wavelength can correct the deviation caused by particle size. Therefore, three light sources are designed in the disclosure. Based on the design of two blue light sources, an infrared light source is added to correct the data. Through the use of three light sources, three different types of data can be received. The three different types of data can extend the classification curve of aerosols to a classification curved surface. The three types of data form a vector input into the classifier, and a machine learning algorithm is used to find the coefficients of the classification curved surface equation to make the classification results more accurate. At the same time, multiple sets of data are obtained in the disclosure to acquire multiple sets of classification results, and statistical methods are used to improve the accuracy of the classification results. In summary, through the disclosure, sensing data based on particle shape characteristics can be corrected, so that the classification of fire smoke and interfering aerosols may be achieved, the false alarm rate of the fire smoke detector is decreased, and targeted and reasonable measures can be taken.

2. In the disclosure, fire smoke and interfering aerosols are distinguished based on differences in shape. As long as there are morphological differences, the disclosure can be used for classification and identification. Fire smoke can be distinguished from common interfering aerosols such as dust, water vapor, and cooking fumes. Compared to classification through comparison of particle sizes, the disclosure has a wider range of applications and higher classification accuracy.

3. Further, fire smoke is subdivided into fire white smoke and fire black smoke, with classification categories including fire white smoke, fire black smoke, and interfering aerosols. By refining the classification, more detailed classification results can be obtained, which can serve as timely corresponding responses.

4. Further, by selecting an angle range, the shape information characteristics of aerosols can be detected more accurately through scattered light intensity at different angles. More specifically, the two acute angles can be the same, so the design of the detector can thus be simplified.

DESCRIPTION OF THE EMBODIMENTS

In order to make the objectives, technical solutions, and advantages of the disclosure clearer and more comprehensible, the disclosure is further described in detail with reference to the drawings and embodiments. It should be understood that the specific embodiments described herein serve to explain the disclosure merely and are not used to limit the disclosure. In addition, the technical features involved in the various embodiments of the invention described below can be combined with each other as long as the technical features do not conflict with each other.

Figure 1:
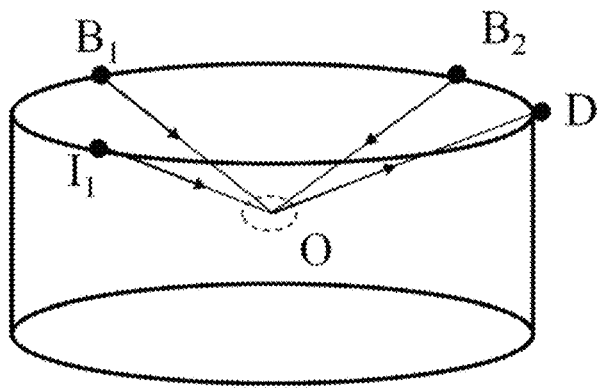
FIG. 1 is a schematic view of a structure of an optical dark chamber according to an embodiment of the disclosure.

The disclosure relates to a fire smoke detection method based on particle shape characteristics, which is used in together with an optical dark chamber having a special structure. As shown in FIG. 1, which is a schematic view of a structure of an optical dark chamber according to an embodiment of the disclosure. The optical dark chamber includes a light source combination and a photoelectric conversion module D. The light source combination includes a light source B1, a light source I1, and a light source B2. Both the light sources B1 and B2 are blue light sources, while the light source I1 is an infrared light source. A center of the optical dark chamber is O. An angle of change in an optical path of a light ray from the light source B1 reflected through the center O to the photoelectric conversion module D is an acute angle. An angle of change in an optical path of a light ray from the light source I1 reflected through center O to the photoelectric conversion module D is an acute angle. An angle of change in an optical path of a light ray from the light source B2 reflected through the center O to the photoelectric conversion module D is an obtuse angle.

To be specific, the light source B1 is an LED light source capable of emitting 450 nm blue light, the light source I1 is an LED light source capable of emitting 950 nm infrared light, and the light source B2 is an LED light source capable of emitting 450 nm blue light. The photoelectric conversion module D is a photoelectric conversion device capable of converting a received scattered light optical power signal into an electrical signal and may specifically be a photo-diode. The angle of change in the optical path of the light ray from B1 through O to D is an acute angle, generally not less than 20°, and specifically may be selected as 40°. The angle of change in the optical path of the light ray from I1 through O to D is an acute angle, generally not less than 20°, and specifically may be selected as 40°. The angle of change in the optical path of the light ray from B2 through O to D is an obtuse angle, generally not greater than 170°, and specifically may be selected as 140°. Selecting the above angle ranges allows for more precise detection of the shape information characteristics of aerosols through scattered light intensities at different angles. More specifically, the two acute angles may be the same, and the design of the detector may thus be simplified.

Figure 2:
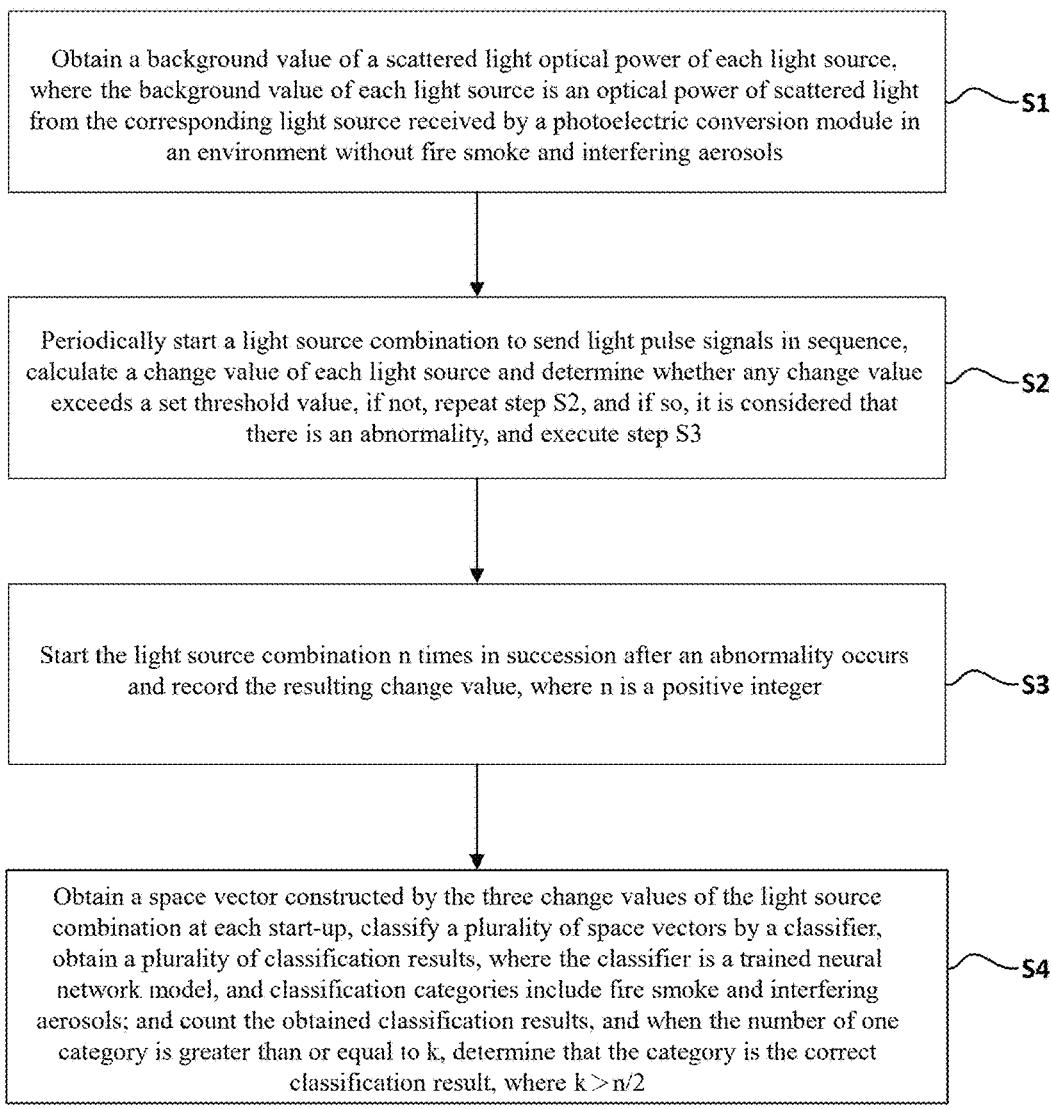
FIG. 2 is a concise step-by-step process of a fire smoke detection method based on particle shape characteristics according to the disclosure.

As shown in FIG. 2, which is a flow chart of steps of a fire smoke detection method based on particle shape characteristics according to an embodiment of the disclosure and includes at least steps S1 to S4. The following provides a detailed introduction to each step.

In step S1, a background value of a scattered light optical power of each light source is obtained. The background value of each light source is the optical power of scattered light from the corresponding light source received by the photoelectric conversion module in an environment without fire smoke and interfering aerosols.

To be specific, initialization is executed at the start of detection. That is, in an environment without fire smoke and interfering aerosols, each light source is started in turn and the optical power of scattered light from the corresponding light source received by the photoelectric conversion module is obtained as the background value of the scattered light optical power of the corresponding light source.

Specifically, during operation, the light source B1, the light source I1, and the light source B2 are turned on in sequence, and the three light sources send light pulse signals in sequence. A period of the light pulse signal may be 1 second, and a pulse width may be from several milliseconds to tens of milliseconds. After each light source emits light, the scattered light optical power received by the photoelectric conversion module is recorded. The photoelectric conversion module converts the optical power signal into a voltage signal, and its AD sampling value is the background value of the scattered light optical power signal for each channel, denoted as $P_0^{B1}$, $P_0^{I1}$, and $P_0^{B2}$.

In step S2, the light source combination is periodically started to send light pulse signals in sequence, a change value of each light source is calculated individually and it is determined that whether any change value exceeds a set threshold value, if not, step S2 is repeated; if so, it is considered that there is an abnormality, and step S3 is executed.

Herein, the change value of each light source is an absolute value of a difference value between a current scattered light optical power from the light source received by the photoelectric conversion module D and the background value of the scattered light optical power of the light source.

To be specifically, at each time interval Δt, the light source B1, the light source I1, and the light source B2 are turned on in sequence, and the three light sources send light pulse signals in sequence. The corresponding background value is subtracted from the scatter light optical power received by the photoelectric conversion module, and corresponding scattered light optical power change values $\Delta P^{B1}$, $\Delta P^{I1}$, and $\Delta P^{B2}$ are obtained. The purpose of this step is to determine whether there is an abnormality in the current environment. When $\Delta P^{B1} > P_{TH}$, $\Delta P^{I1} > P_{TH}$, or $\Delta P^{B2} > P_{TH}$, it is considered that there is an abnormality in the current environment, and subsequent steps are continued to further identify the type of particles causing the abnormality. Otherwise, this step is repeated. Herein, $P_{TH}$ is a pre-set threshold value, selected based on experiments, generally 300 to 500.

In step S3, the light source combination is started n times in succession after an abnormality occurs, and a resulting change value is recorded, where n is a positive integer.

To be specific, if an abnormality exists in the current environment, a series of change values $\Delta P^{B1}$, $\Delta P^{I1}$, $\Delta P^{B2}$ are continuously recorded. The change value for the light source B1 is recorded as $\Delta P_{arr}^{B1} = [\Delta P_1^{B1}, \Delta P_2^{B1}, \ldots, \Delta P_n^{B1}]$, where $\Delta P_i^{B1}$ represents the change value obtained from the $i^{th}$ start of the light source B1. The change value for the light source I1 is recorded as $\Delta P_{arr}^{I1} = [\Delta P_1^{I1}, \Delta P_2^{I1}, \ldots, \Delta P_n^{I1}]$, where $\Delta P_i^{I1}$ represents the change value obtained from the $i^{th}$ start of the light source I1. The change value for the light source B2 is recorded as $\Delta PB2 = [\Delta P_1^{B2}, \Delta P_2^{B2}, \ldots, \Delta P_n^{B2}]$, where $\Delta P_i^{B2}$ represents the change value obtained from the $i^{th}$ start of the light source B2. To be specific, n may be set to 10, meaning 10 sets of data are collected for category determination.

In step S4, a space vector constructed by the three change values of the light source combination at each start-up is obtained, a plurality of space vectors are classified by a classifier, and a plurality of classification results are obtained. The classifier is a trained neural network model, and classification categories include fire smoke and interfering aerosols. The obtained plurality of classification results are counted, and when the number of one category is greater than or equal to k, it is determined that the category is the correct classification result, where k>n/2.

To be specific, the change values obtained in step S3 are converted to obtain the space vectors $\overrightarrow{\Delta P_1} = [\Delta P_1^{B1}, \Delta P_1^{I1}, \Delta P_1^{B2}]$, $\overrightarrow{\Delta P_2} = [\Delta P_2^{B1}, \Delta P_2^{I1}, \Delta P_2^{B2}]$, ... and $\overrightarrow{\Delta P_n} = [\Delta P_n^{B1}, \Delta P_n^{I1}, \Delta P_n^{B2}]$. The classifier is used to predict each space vector. A plurality of classification results may be obtained by predicting a plurality of space vectors. If there are more than or equal to k classification results that are the same among the n prediction results, it means that the probability of the classification result is relatively high, and the classification result is treated as the correct classification result. To be specific, n may be set to 10, and k may be set to 8.

To be specific, there are also certain morphological differences between white smoke and black smoke. Fire white smoke forms shorter chain-like structures, while fire black smoke forms longer chain-like structures. Therefore, fire smoke may be further subdivided into fire white smoke and fire black smoke, that is, the overall classification categories are fire white smoke, fire black smoke, and interfering aerosols. If the classification result is fire white smoke, the fire detector sends an alarm signal and simultaneously indicates that the fire smoke type is white smoke. If the classification result is fire black smoke, the fire detector sends an alarm signal and simultaneously indicates that the fire smoke type is black smoke. If the classification result is interfering aerosols, the fire detector sends an interference signal.

The classifier is a pre-trained model, and before the classifier is used for classification, historical data is used to train the classifier. To be specific, the classifier may directly adopt a multi-classification model, or it may adopt a plurality of binary classification models.

For instance, when the categories are fire white smoke, fire black smoke, and interfering aerosols, if a multi-classifier model is used, this model can directly distinguish among fire white smoke, fire black smoke, and interfering aerosols. If the model used only supports binary classification problems, while the fire detector needs to distinguish among fire white smoke, fire black smoke, and interfering aerosols, three binary classifiers are required. Three support vector machine (SVM) binary classification models may be adopted, namely SVMModel1, SVMModel2, and SVMModel3. Herein, SVMModel1 is used to classify interfering aerosols and fire white smoke, SVMModel2 is used to classify fire white smoke and fire black smoke, and SVMModel3 is used to classify interfering aerosols and fire black smoke. These three SVM classifiers are used to predict each vector, and a mode of the prediction results from the three classifiers is treated as the classification result for the corresponding space vector. In this embodiment, the SVM binary classification model is selected, which can map space vectors to higher-dimensional spaces, so the accuracy of classification results is improved.

In an embodiment, in step S4, when there are no categories with a number greater than or equal to k in the counting results of multiple classifications, the process returns to step S3 to re-obtain the change value and re-classify until the correct classification result is determined.

Figure 3:
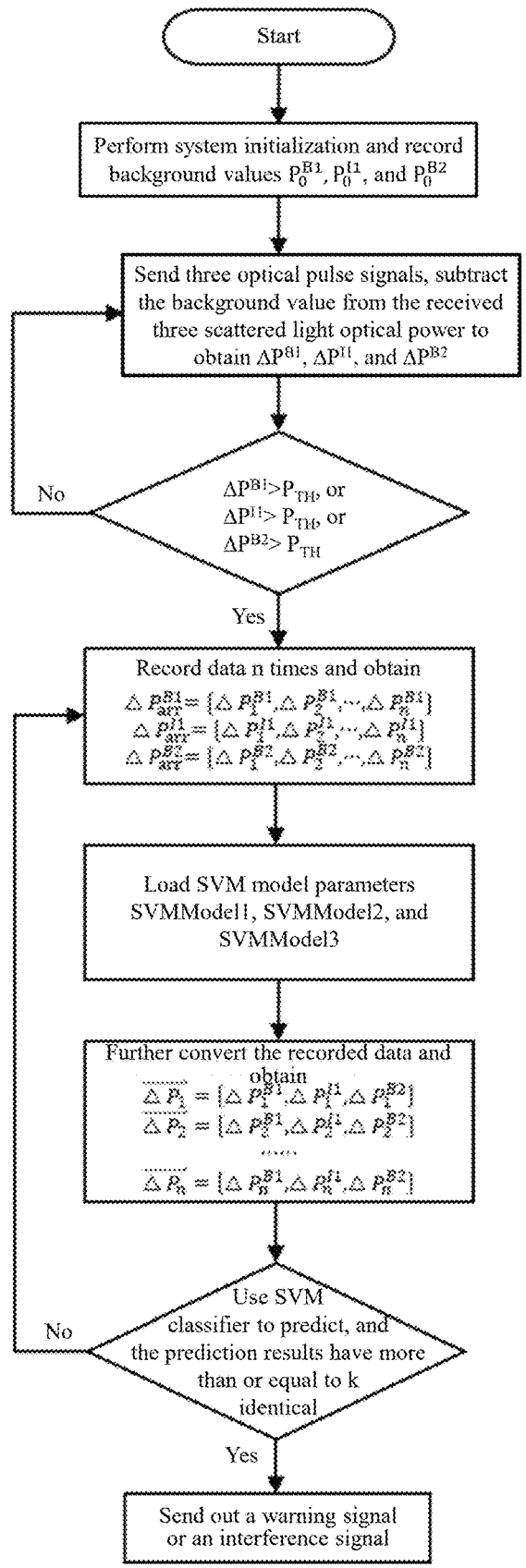
FIG. 3 is an algorithm logic chart of steps of a fire smoke detection method based on particle shape characteristics according to embodiment of the disclosure.

As shown in FIG. 3, which is an algorithm logic chart of steps of a fire smoke detection method based on particle shape characteristics according to the embodiment of the disclosure, and the following specific process is included.

System initialization is performed, and the background values $P_0^{B1}$, $P_0^{I1}$, and $P_0^{B2}$ are recorded.

The three light sources send light pulse signals in sequence. The corresponding background value is subtracted from the scatter light optical power received by the photoelectric conversion module, and corresponding scattered light optical power change values $\Delta P^{B1}$, $\Delta P^{I1}$, and $\Delta P^{B2}$ are obtained.

It is determined whether $\Delta P^{B1} > P_{TH}$, $\Delta P^{I1} > P_{TH}$, or $\Delta P^{B2} > P_{TH}$ exists. If not, the above step is repeated; if so, the following steps are performed.

A series of $\Delta P^{B1}$, $\Delta P^{I1}$, and $\Delta P^{B2}$ are recorded continuously to obtain $\Delta P_{arr}^{B1} = [\Delta P_1^{B1}, \Delta P_2^{B1}, \ldots, \Delta P_n^{B1}]$, $\Delta P_{arr}^{I1} = [\Delta P_1^{I1}, \Delta P_2^{I1}, \ldots, \Delta P_n^{I1}]$, and $\Delta P_{arr}^{B2} = [\Delta P_1^{B2}, \Delta P_2^{B2}, \ldots, \Delta P_n^{B2}]$.

The pre-trained model parameters SVMModel1, SVMModel2, SVMModel3 of the three SVM binary classifiers are loaded.

SVM classifiers are used for classification prediction, and it is determined whether there are classification results greater than or equal to k times in the prediction results. If so, the classification result is determined and an alarm or interference signal is issued according to the classification result. If not, return to the step of continuously recording a series of $\Delta P^{B1}$, $\Delta P^{I1}$, and $\Delta P^{B2}$ until the correct classification is achieved.

Figure 4:
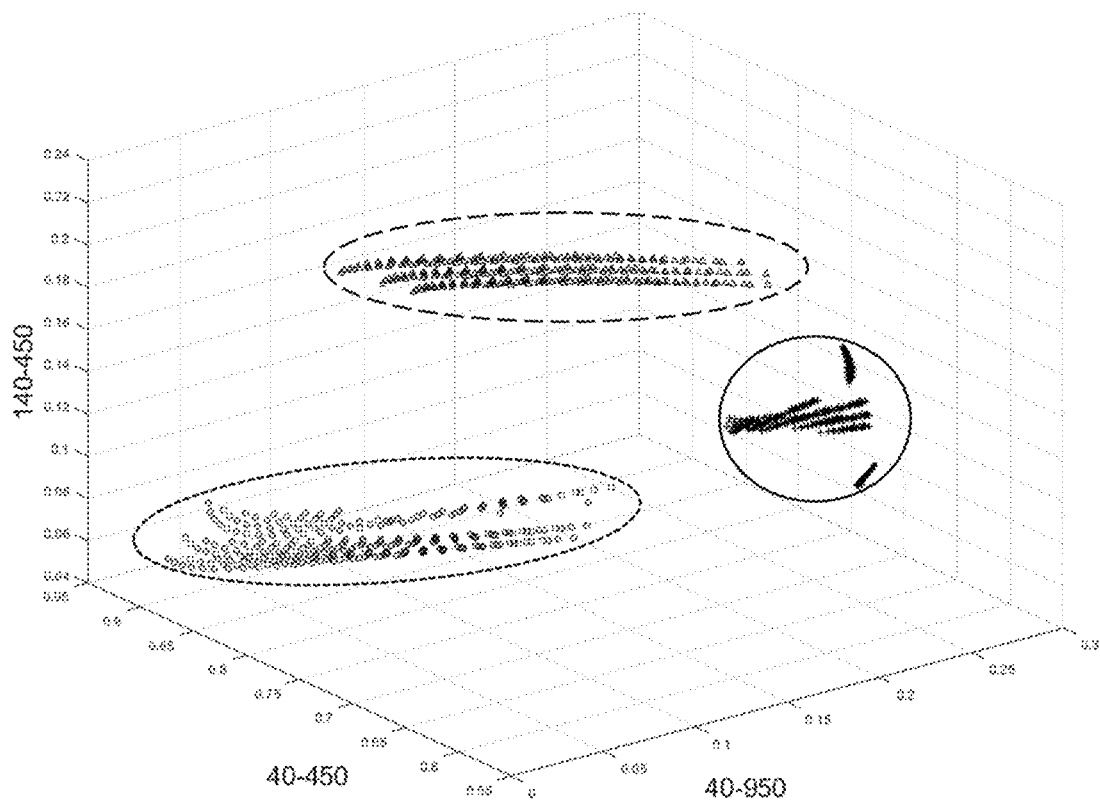
FIG. 4 is an experimental test chart of classification results in according to an embodiment of the disclosure.

As shown in FIG. 4, which is an experimental test chart of classification results in according to an embodiment of the disclosure. In this figure, circles represent fire white smoke, triangles represent fire black smoke, and plus signs represent interfering aerosols. According to this figure, it may be visually determined which classification result is greater than or equal to k. In the environment of smoke detection, there are differences in shape between interfering aerosols and fire smoke. The formation of smoke particles is a dynamic process. During combustion, many nanoscale primary particles are formed. These primary particles collide and combine into larger smoke particle agglomerates under the effect of coagulation. Smoke particle agglomerates have obvious fractal characteristics, with irregular morphology and loose structure, generally showing obvious non-spherical characteristics. Especially for polyurethane and tobacco smoke particle aggregates, they present chain-like shape characteristics. In contrast, interfering aerosols are generally produced through physical reactions, and their shapes are usually spherical. Therefore, there are differences in particle shape between fire smoke and interfering aerosols. These differences in particle shape may manifest as unique fingerprint characteristics of particles in light scattering. Therefore, classification of fire smoke and interfering aerosols may be achieved through the differences in particle shape, and that a false alarm rate of a conventional smoke-sensitive fire detector may be decreased. Through research, the applicant has found that in the design of photoelectric fire smoke detectors, scattering characteristics of light sources with the same wavelength but different observation angles may be used to distinguish particle shapes. However, the research also found that when interfering aerosol particles are larger, it may affect the change in scattered light intensity, which may cause some deviation in the sensing of these scattering characteristics. To reduce false alarms when the interfering aerosol particles are larger, the research and development team further explored and found that adding one light source with a different wavelength may correct the deviation caused by particle size. Therefore, three light sources are designed in the disclosure. Based on the design of two blue light sources, an infrared light source is added to correct the data. Through the use of three light sources, three different types of data may be received. The three different types of data may extend the classification curve of aerosols to a classification curved surface. The three types of data form a vector input into the classifier, and a machine learning algorithm is used to find the coefficients of the classification curved surface equation to make the classification results more accurate. At the same time, multiple sets of data are obtained in the disclosure to acquire multiple sets of classification results, and statistical methods are used to improve the accuracy of the classification results. In summary, through the disclosure, sensing data based on particle shape characteristics may be corrected, so that the classification of fire smoke and interfering aerosols may be achieved, the false alarm rate of the fire smoke detector is decreased, and targeted and reasonable measures can be taken.

The disclosure further provides a fire smoke detector including an optical dark chamber and a control module. The optical dark chamber includes a light source combination and a photoelectric conversion module D. The light source combination includes a light source B1, a light source I1, and a light source B2. Both the light sources B1 and B2 are blue light sources, while the light source I1 is an infrared light source. A center of the optical dark chamber is O. An angle of change in an optical path of a light ray from the light source B1 reflected through the center O to the photoelectric conversion module D is an acute angle. An angle of change in an optical path of a light ray from the light source I1 reflected through center O to the photoelectric conversion module D is an acute angle. An angle of change in an optical path of a light ray from the light source B2 reflected through the center O to the photoelectric conversion module D is an obtuse angle. The control module is used to work with the optical dark chamber and execute the smoke-sensitive fire detection method based on particle shape characteristics as described in the foregoing paragraphs. To be specific, regarding the optical dark chamber and the specific detection method, please refer to the description above, which is not repeated herein.

In view of the foregoing, in the disclosure, three light sources are employed, two of which use blue light LED sources, and the other uses an infrared light source, to construct the optical dark chamber. Combined with the data processing of the control module, precise classification of fire smoke and interfering aerosols may be achieved. Therefore, the false alarm rate of a conventional fire smoke detector is decreased, and the detection accuracy of the photoelectric fire smoke detector is thus improved.

The technical features of the above-described embodiments may be combined arbitrarily. In order to simplify the description, not all possible combinations of the technical features in the above embodiments are described. However, as long as there is no contradiction in the combinations of these technical features, these combinations should be considered to be within the scope of the description in this specification. It should be noted that "in an embodiment", "for instance", "further example", etc. in the disclosure are intended to provide exemplary illustrations of the disclosure and are not intended to limit the disclosure.

The abovementioned embodiments only represent several embodiments of the disclosure, and the descriptions thereof are specific and detailed, but should not be construed as a limitation on the scope of the invention patent. It should be pointed out that for a person having ordinary skill in the art, without departing from the concept of the disclosure, several modifications and improvements can be made, which all belong to the protection scope of the disclosure.

What is claimed is:

1. A fire smoke detection method based on particle shape characteristics for detecting particles in an optical dark chamber, wherein the optical dark chamber comprises a light source combination and a photoelectric conversion module D, the light source combination is a light source B1, a light source I1, and a light source B2, the light source B1 and the light source B2 are both blue light sources, the light source I1 is an infrared light source, a center of the optical dark chamber is O, an angle of change in an optical path of a light ray from the light source B1 reflected through the center O to the photoelectric conversion module D is an acute angle, an angle of change in an optical path of a light ray from the light source I1 reflected through the center O to the photoelectric conversion module D is an acute angle, and an angle of change in an optical path of a light ray from the light source B2 reflected through the center O to the photoelectric conversion module D is an obtuse angle, wherein scattering characteristics of the light sources B1 and the light sources B2, which have same wavelength but different observation angles, are used to distinguish particle shapes, scattering characteristics of the light source I1, which has a different wavelength, are used to correct the deviation caused by large aerosol particles, extending an aerosol classification curve to a classification surface by combining data from three different light sources, obtaining an accurate classification result by a neural network model, which is used to learn and find coefficients of the classification surface equation, the fire smoke detection method comprises:
step S1: obtaining a background value of a scattered light optical power of each light source, wherein the background value of the each light source is an optical power of scattered light from corresponding light source received by the photoelectric conversion module in an environment without fire smoke and interfering aerosols;

step S2: periodically starting the light source combination to send light pulse signals in sequence, calculating a change value of the each light source and determining whether any change value exceeds a set threshold value, when not, repeating step S2, and when so, it is considered that there is an abnormality, and executing step S3, wherein the change value of the each light source is an absolute value of a difference value between a current scattered light optical power from the light source received by the photoelectric conversion module D and the background value of the scattered light optical power of the light source;

step S3: starting the light source combination n times in succession after an abnormality occurs and recording a resulting change value, where n is a positive integer; and step S4: constructing three change values of the light source combination at each start-up into a space vector, classifying n space vectors by a classifier based on differences in particle shape between fire smoke and interfering aerosols, obtaining n classification results, wherein the classifier is a trained neural network model, and classification categories comprise fire smoke and interfering aerosols, the fire smoke exhibits chain-like shape, the interfering aerosols are spherical; counting the obtained n classification results; and when a number of one category is greater than or equal to k, determining that the category is a correct classification result, where k>n/2.

2. The fire smoke detection method based on particle shape characteristics according to claim 1, wherein in step S4, when there are no categories with a number greater than or equal to k in counting results of multiple classifications, proceeding to step S3 to re-obtain the change value to re-classify until the correct classification result is determined.

3. A fire smoke detector based on particle shape characteristics, comprising the optical dark chamber and a control module, wherein the optical dark chamber comprises the light source combination and the photoelectric conversion module D, the light source combination is the light source B1, the light source I1, and the light source B2, the light source B1 and the light source B2 are both blue light sources, the light source I1 is the infrared light source, the center of the optical dark chamber is O, an angle of change in the optical path of a light ray from the light source B1 reflected through the center O to the photoelectric conversion module D is an acute angle, an angle of change in an optical path of a light ray from the light source I1 reflected through the center O to the photoelectric conversion module D is an acute angle, and an angle of change in an optical path of a light ray from the light source B2 reflected through the center O to the photoelectric conversion module D is an obtuse angle, the control module is configured to execute a method according to claim 2.

4. The fire smoke detection method based on particle shape characteristics according to claim 1, wherein n is greater than or equal to 10, and k is greater than or equal to 8.

5. A fire smoke detector based on particle shape characteristics, comprising the optical dark chamber and a control module, wherein the optical dark chamber comprises the light source combination and the photoelectric conversion module D, the light source combination is the light source B1, the light source I1, and the light source B2, the light source B1 and the light source B2 are both blue light sources, the light source I1 is the infrared light source, the center of the optical dark chamber is O, an angle of change in the optical path of a light ray from the light source B1 reflected through the center O to the photoelectric conversion module D is an acute angle, an angle of change in an optical path of a light ray from the light source I1 reflected through the center O to the photoelectric conversion module D is an acute angle, and an angle of change in an optical path of a light ray from the light source B2 reflected through the center O to the photoelectric conversion module D is an obtuse angle, the control module is configured to execute a method according to claim 4.

6. The fire smoke detection method based on particle shape characteristics according to claim 1, wherein the classification categories comprise fire white smoke, fire black smoke, and interfering aerosols, and the interfering aerosols comprise any one or more of dust, water vapor, or cooking fumes.

7. A fire smoke detector based on particle shape characteristics, comprising the optical dark chamber and a control module, wherein the optical dark chamber comprises the light source combination and the photoelectric conversion module D, the light source combination is the light source B1, the light source I1, and the light source B2, the light source B1 and the light source B2 are both blue light sources, the light source I1 is the infrared light source, the center of the optical dark chamber is O, an angle of change in the optical path of a light ray from the light source B1 reflected through the center O to the photoelectric conversion module D is an acute angle, an angle of change in an optical path of a light ray from the light source I1 reflected through the center O to the photoelectric conversion module D is an acute angle, and an angle of change in an optical path of a light ray from the light source B2 reflected through the center O to the photoelectric conversion module D is an obtuse angle, the control module is configured to execute a method according to claim 6.

8. The fire smoke detection method based on particle shape characteristics according to claim 1, wherein the process of obtaining the background value of the scattered light optical power of the each light source in step S1 comprises:

performing initialization: in an environment without fire smoke and interfering aerosols, starting the each light source in turn and obtaining the optical power of scattered light from the corresponding light source received by the photoelectric conversion module as the background value of the scattered light optical power of the corresponding light source.

9. A fire smoke detector based on particle shape characteristics, comprising the optical dark chamber and a control module, wherein the optical dark chamber comprises the light source combination and the photoelectric conversion module D, the light source combination is the light source B1, the light source I1, and the light source B2, the light source B1 and the light source B2 are both blue light sources, the light source I1 is the infrared light source, the center of the optical dark chamber is O, an angle of change in the optical path of a light ray from the light source B1 reflected through the center O to the photoelectric conversion module D is an acute angle, an angle of change in an optical path of a light ray from the light source I1 reflected through the center O to the photoelectric conversion module D is an acute angle, and an angle of change in an optical path of a light ray from the light source B2 reflected through the center O to the photoelectric conversion module D is an obtuse angle, the control module is configured to execute a method according to claim 8.

10. The fire smoke detection method based on particle shape characteristics according to claim 1, wherein a period of starting the light source combination to send the light pulse signals is 1 second or several seconds, and a pulse width of each light pulse signal ranges from several milliseconds to tens of milliseconds.

11. A fire smoke detector based on particle shape characteristics, comprising the optical dark chamber and a control module, wherein the optical dark chamber comprises the light source combination and the photoelectric conversion module D, the light source combination is the light source B1, the light source I1, and the light source B2, the light source B1 and the light source B2 are both blue light sources, the light source I1 is the infrared light source, the center of the optical dark chamber is O, an angle of change in the optical path of a light ray from the light source B1 reflected through the center O to the photoelectric conversion module D is an acute angle, an angle of change in an optical path of a light ray from the light source I1 reflected through the center O to the photoelectric conversion module D is an acute angle, and an angle of change in an optical path of a light ray from the light source B2 reflected through the center O to the photoelectric conversion module D is an obtuse angle, the control module is configured to execute a method according to claim 10.

12. The fire smoke detection method based on particle shape characteristics according to claim 1, wherein the classifier comprises a plurality of binary classification models of support vector machines (SVMs), each of the binary classification models is used to implement classification of two different categories, and when the classifier is used to classify any space vector, each binary classification model performs binary classification on a input space vector, and a mode of the classification results of all binary classification models is treated as the classification result of the classifier for the vector.

13. A fire smoke detector based on particle shape characteristics, comprising the optical dark chamber and a control module, wherein the optical dark chamber comprises the light source combination and the photoelectric conversion module D, the light source combination is the light source B1, the light source I1, and the light source B2, the light source B1 and the light source B2 are both blue light sources, the light source I1 is the infrared light source, the center of the optical dark chamber is O, an angle of change in the optical path of a light ray from the light source B1 reflected through the center O to the photoelectric conversion module D is an acute angle, an angle of change in an optical path of a light ray from the light source I1 reflected through the center O to the photoelectric conversion module D is an acute angle, and an angle of change in an optical path of a light ray from the light source B2 reflected through the center O to the photoelectric conversion module D is an obtuse angle, the control module is configured to execute a method according to claim 12.

14. A fire smoke detector based on particle shape characteristics, comprising the optical dark chamber and a control module, wherein the optical dark chamber comprises the light source combination and the photoelectric conversion module D, the light source combination is the light source B1, the light source I1, and the light source B2, the light source B1 and the light source B2 are both blue light sources, the light source I1 is the infrared light source, the center of the optical dark chamber is O, an angle of change in the optical path of a light ray from the light source B1 reflected through the center O to the photoelectric conversion module D is an acute angle, an angle of change in an optical path of a light ray from the light source I1 reflected through the center O to the photoelectric conversion module D is an acute angle, and an angle of change in an optical path of a light ray from the light source B2 reflected through the center O to the photoelectric conversion module D is an obtuse angle, the control module is configured to execute a method according to claim 1.

15. The fire smoke detector based on particle shape characteristics according to claim 14, wherein the acute angles are not less than 20°, and the obtuse angle is not greater than 170°.

16. The fire smoke detector based on particle shape characteristics according to claim 14, wherein the angles of two acute angles are the same or differ by less than 10°.

* * * * *